(12) United States Patent
Shah et al.

(10) Patent No.: US 9,811,762 B2
(45) Date of Patent: Nov. 7, 2017

(54) CLOTHING MATCHING SYSTEM AND METHOD

(71) Applicants: Swati Shah, Kirkland, WA (US); Shantha Pathak, Kirkland, WA (US)

(72) Inventors: Swati Shah, Kirkland, WA (US); Shantha Pathak, Kirkland, WA (US)

( * ) Notice: Subject to any disclaimer, the term of this patent is extended or adjusted under 35 U.S.C. 154(b) by 25 days.

(21) Appl. No.: 15/160,284

(22) Filed: May 20, 2016

(65) Prior Publication Data
US 2017/0083789 A1     Mar. 23, 2017

(30) Foreign Application Priority Data

Sep. 22, 2015  (IN) .......................... 5049/CHE/2015

(51) Int. Cl.
*G06K 9/00* (2006.01)
*G06K 9/62* (2006.01)
*G06T 7/90* (2017.01)

(52) U.S. Cl.
CPC ....... *G06K 9/6256* (2013.01); *G06K 9/00362* (2013.01); *G06T 7/90* (2017.01); *G06T 2207/30196* (2013.01)

(58) Field of Classification Search
CPC ...... G06K 9/6201; G06K 9/52; G06K 9/6256; G06K 9/6267; G06K 9/66; G06T 2207/30196
See application file for complete search history.

(56) References Cited

U.S. PATENT DOCUMENTS

| 8,861,866 B2* | 10/2014 | Zhang | G06K 9/00664 382/111 |
| 2008/0082426 A1* | 4/2008 | Gokturk | G06F 17/30256 705/26.62 |
| 2008/0212899 A1* | 9/2008 | Gokturk | G06F 17/30259 382/305 |
| 2009/0116698 A1* | 5/2009 | Zhang | G06K 9/00362 382/111 |
| 2009/0138377 A1* | 5/2009 | Oh | G06Q 30/0601 705/26.1 |
| 2010/0066735 A1* | 3/2010 | Givon | G06K 9/00369 345/419 |

(Continued)

OTHER PUBLICATIONS

Chao et al., A framework for Robust Feature Selection for Real-time Fashion Style Recommendation, IMCE, Oct. 23, 2009.*

*Primary Examiner* — John Strege
(74) *Attorney, Agent, or Firm* — The Law Office of Austin Bonderer, PC; Austin Bonderer

(57) ABSTRACT

A system and method for clothing matching is provided. The clothing matching system automatically processes the captured image of the user once the image is captured and identifies a face region, a torso region, and a bottom region of the user from the captured image. The clothing matching system further identifies (i) colour coordination and contrast of the captured image, (ii) a dress colour and a pattern of clothes of the user in the captured image, (iii) a body type of the user, and (iv) a skin tone of the user in the captured image. The clothing matching system communicates information related to the captured image to the server. The server receives the information and compares the information related to the captured image of the user with the training images/patterns stored in the ML model to compute a score for the captured image of the user for the dress combination.

20 Claims, 11 Drawing Sheets

(56) References Cited

U.S. PATENT DOCUMENTS

| | | | |
|---|---|---|---|
| 2011/0274314 A1* | 11/2011 | Yang | G06K 9/00369 |
| | | | 382/103 |
| 2012/0140987 A1* | 6/2012 | Singh | G06K 9/48 |
| | | | 382/103 |
| 2012/0201468 A1* | 8/2012 | Oami | G06K 9/00362 |
| | | | 382/199 |
| 2013/0044944 A1* | 2/2013 | Wang | G06F 17/3025 |
| | | | 382/165 |
| 2013/0129210 A1* | 5/2013 | Na | G06K 9/00268 |
| | | | 382/165 |
| 2013/0179288 A1* | 7/2013 | Moses | G06Q 10/00 |
| | | | 705/26.1 |
| 2013/0343615 A1* | 12/2013 | Zhang | G06K 9/00664 |
| | | | 382/111 |
| 2014/0040041 A1* | 2/2014 | Ohnemus | G06Q 30/0627 |
| | | | 705/14.66 |
| 2014/0358738 A1* | 12/2014 | Ohnemus | G06Q 30/0643 |
| | | | 705/27.2 |
| 2015/0332479 A1* | 11/2015 | Gershon | G06F 17/3025 |
| | | | 382/164 |
| 2016/0019626 A1* | 1/2016 | Pham | G06Q 30/0631 |
| | | | 705/26.7 |
| 2016/0042520 A1* | 2/2016 | Taneja | G06K 9/00335 |
| | | | 382/154 |
| 2016/0048721 A1* | 2/2016 | Harper | G06K 9/00771 |
| | | | 382/103 |
| 2016/0117749 A1* | 4/2016 | Desmarais | A41H 3/007 |
| | | | 382/111 |

* cited by examiner

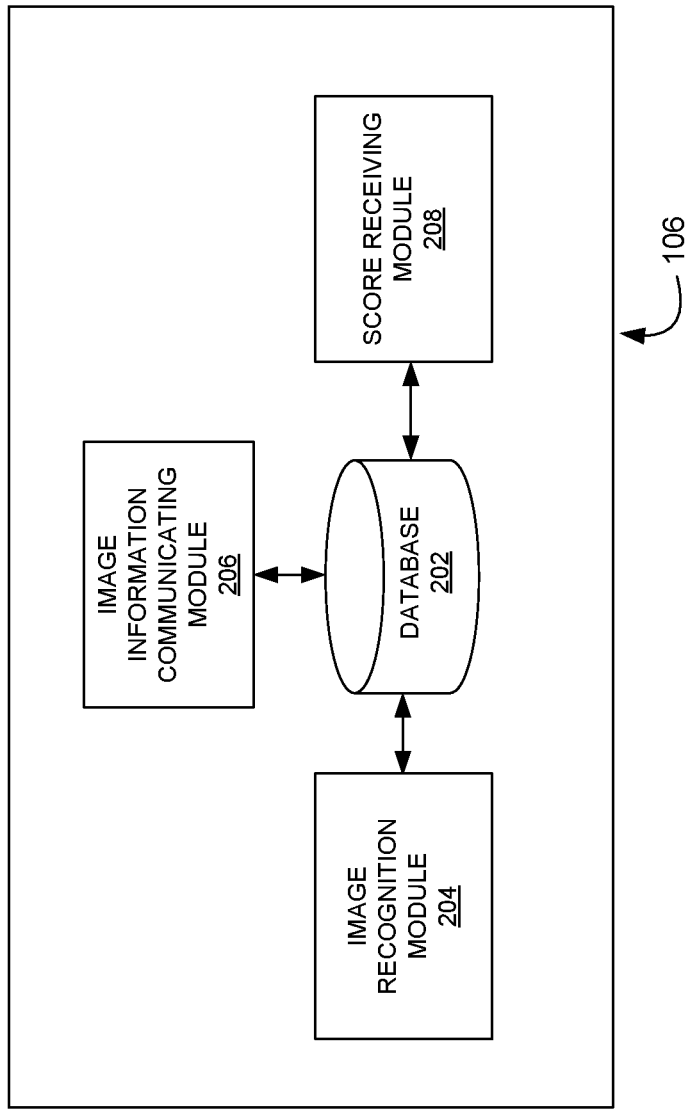

| REGIONS | FACE REGION 302 | TORSO REGION 304 | FOOT REGION 306 |
|---|---|---|---|
| SCORE FOR EACH REGION | 7/10 | 8/10 | 9/10 |
| CUMULATIVE SCORE FOR CAPTURED IMAGE | 8/10 | | |

CLOTHING MATCHING SYSTEM AND METHOD

CROSS REFERENCE TO RELATED APPLICATIONS

This application claims priority to Indian patent application no. 5049/CHE/2015 filed on Sep. 22, 2015, the complete disclosure of which, in its entirely, is herein incorporated by reference.

BACKGROUND

Technical Field

The embodiments herein generally relate to a system and method for matching clothing, and, more particularly, to a system and method for computing a score for a dress combination worn by a user using a machine learning model.

Description of the Related Art

Each day, we ask ourselves what to wear. Our wardrobes may contain various kinds of clothes, such as dress shirts, dress pants, jeans, sweaters, suits, and different types of shoes. It is challenge to decide what combination of clothes will be the most appropriate for the day's activities, and also maximize our visual appeal. A suitable outfit requires combining a variety of clothing items to satisfy functional and certain visual criteria. For example, a pair of sandals with formal pants is generally not worn to the office, and neither is a red shirt worn with a green suit for a business meeting.

Color matching is an important element relative to the successful selection of clothing. Too often colors are incorrectly matched, leading to unattractive and unappealing color combinations. When one piece of clothing, for example, has to be color coordinated with clothing, i.e., a blouse with a skirt, a shirt with a suit, etc., people often physically compare the colors of the garments side by side to determine whether there is a good match. This may require the person to take a piece of clothing from home into the store and physically inspect the garments.

It may also require the person to have a relatively good sense of color, as well as what looks good, which isn't always the case. In fact, in many situations, in addition to matching colors between garments, the wearer may also have to match the clothing selection with his/her skin, hair and/or eye color, in which case, the person making the decision not only has to match the garments, but also has to coordinate his or her personal traits with the clothing selection, which isn't always an easy task.

Most people are unable to understand if the clothes they try on look good on them or not. There are certain combinations that most people will agree that will not look good when put together. For example (a) polka dot top with a stripe pant, (b) purple pant with a green top, and (c) someone on the heavier side wearing horizontal stripes. These rules are not intuitive for everyone and as they are not well documented people might not always make the right choice of what looks good on them. When people go to buy clothes there is often no ready feedback available to help them make a purchase, Also, color space is complicated and is very dependent on poorly understood interactions between human eye, the ambient lighting, and the individual 'cognition of the interaction of these elements with the clothing in question in the context of the person wearing it.

Accordingly, there remains a need for a system to provide real time feedback on how a dress a user is wearing or trying on looks good or suits them.

SUMMARY

In view of the foregoing, an embodiment herein provides a system for computing a score for dress combination of a user. The system includes a clothing matching system that detects characteristics information related to a captured image of a user. The clothing matching system includes a memory, and a processor. The memory stores a database and a first set of modules. The database includes at least one of (i) annotations and a computed score for the captured image of the user, and (ii) a set of rules to compute the score for the captured image. The processor executes the first set of modules. The first set of modules includes an image recognition module, an image information communication module and a score receiving module. The image recognition module, executed by the processor, configured to capture an image of the user when the user wears clothes that he/she wants to buy or evaluate. The image recognition module automatically recognizes the captured image of the user once the image is captured. The image recognition module includes a colour coordination module, a fit analysis module, and a skin tone detection module. The colour coordination module, executed by the processor, configured to detect a colour and a pattern type of the clothes that the user worn in the captured image. The fit analysis module, executed by the processor, configured to detect whether the clothes that worn by the user in the captured image suit a body type of the user and/or fit the user. The skin tone detection module, executed by the processor, configured to detect a skin tone of the user in the captured image. The image information communication module, executed by the processor, configured to communicate characteristics information related to the captured image of the user to a server to compute a score for the dress combination for the captured image of the user. The score receiving module, executed by the processor, configured to (i) receive the computed score for the captured image of the user from the server, and (ii) display the received score to the user through a first computing device.

In one embodiment, the image recognition modules further includes a body part demarcation module, executed by the processor, configured to identify and demarcate a face region, a torso region, a bottom region and/or a leg/foot region of the user in the captured image. In another embodiment, the server includes a server memory and a server processor. The server memory stores a server database and a second set of modules. The server database includes a machine-learning (ML) model. The machine-learning (ML) model stores at least one of (i) trained images/patterns, (ii) a score provided by one or more human labellers for each of training images, (iii) annotations associated with each of the training images, (iv) a set of rules to compute a score for a captured image of a user, and (v) a computed score for dress combination for the captured image of the user. The server processor executes the second set of modules. The second set of modules includes an image information receiving module and a scoring module. The image information receiving module, executed by the server processor, configured to receive characteristics information related to the captured image of the user from the clothing matching system to compute the score for the dress combination for the captured image of the user. The scoring module, executed by the server processor, configured to (i) compute the score for dress combination for the captured image of the user by comparing characteristics information of the captured image with the annotated training images and/or patterns that are stored in said machine learning (ML) model, and (ii) communicate said computed score for the dress combination to the clothing matching system. In yet another embodiment, the image recognition module automatically processes the captured image of the user to detect the characteristics information that includes at least one of (i) a colour coordination and contrast of the captured image, (ii) a dress colour and a pattern type of clothes, (iii) a body type of the user, (iv) whether the clothes that worn by the user in the captured image suit a body type of the user and/or fit the user, and (v) a skin tone of the user.

In yet another embodiment, the image recognition module identifies a gender and an age of the user from the captured image. In yet another embodiment, the image information communication module communicates the gender and the age information of the user to the server to compute a score for the dress combination for the captured image of the user. In yet another embodiment, the score receiving module receives (i) the score for the captured image of the user, and (ii) a feedback/annotation for the captured image of the user from the server. In yet another embodiment, the clothing matching system automatically recognizes the captured image of the user using image processing techniques when the user captures an image using the first computing device. In yet another embodiment, the clothing matching system includes an image-processing component to identify the characteristics information associated with the captured image of the user. In yet another embodiment, the system further includes an image training system that is configured to provides one or more options to one or more human labellers to (a) demarcate (i) a face region, (ii) a torso region, and (iii) a bottom region of each of the training images, (b) provide a score for (i) the face region, (ii) the torso region, and (iii) the bottom region of each of the training images based on characteristics of demarcated regions such as at least one of a colour coordination, a dress colour, a pattern of clothes, a body type, (iii) provide a score for each of the training images based on the characteristics of the training image. In yet another embodiment, the image training system provides an option to the one or more human labellers to annotate thousands of training images/patterns as at least one of, but not limited to (i) good or bad dressed people, (ii) dashing, (iii) gorgeous, (iv) dull, (v) passable, or (vi) not quite based on the characteristics of the captured image. In yet another embodiment, the image information receiving module receives information related to a gender type and an age of the user from the clothing matching system. In yet another embodiment, the scoring module (i) computes (a) a cumulative score for the entire captured image of the user, and (b) an individual scores for the face region, the torso region, and the bottom region of the captured image of the user, (ii) provide feedback/annotation on whether the dress combination of the user in the captured image is (a) good or bad, (b) dashing, (c) gorgeous, (d) dull, (e) passable, or (f) not quite, and (iii) communicate the feedback/annotation to the clothing matching system.

In one aspect, a computer implemented method for detecting characteristics information related to a captured image of a user to compute a score for dress combination using clothing matching system is provided. The method includes the following steps: (a) capturing an image of the user when the user wears clothes that want to buy; (b) recognizing the image of the user when the image is captured using a first computing device; (c) identifying and demarcating a face region, a torso region, and a bottom region of the captured image; (d) detecting a colour and pattern type of clothes that the user wearing in the captured image; (e) detecting whether the clothes that worn by the user in the captured image suit body type of the user; (f) detecting a skin tone of the user in the captured image; (g) communicating characteristics information related to the captured image that includes at least one of (i) a colour coordination and contrast of the clothes, (ii) a dress colour and pattern type of the clothes, (iii) a body type of the user, (iv) whether the clothes that worn by the user in the captured image suit a body type of the user and/or fit the user, and (v) a skin tone of the user to a server; and (h) receiving a computed score for the captured image of the user from the server to display the computed score to the user through the first computing device.

In one embodiment, the server performs the following steps (a) receiving the characteristics information associated with the captured image such as at least one of (i) the colour coordination and contrast of the clothes, (ii) the dress colour and pattern type of the clothes, (iii) the body type of the user, (iv) whether the clothes that worn by the user in the captured image suit the body type of the user and/or fit the user, and (v) the skin tone of the user from the clothing matching system; (b) computing the score for dress combination for the captured image of the user by comparing (i) the colour coordination and contrast of the clothes, (ii) the dress colour and pattern type of the clothes, (iii) the body type of the user, (iv) whether the clothes that worn by the user in the captured image suit the body type of the user and/or fit the user, and (v) the skin tone of the user in the captured image with thousands of trained images/patterns that is stored in a machine-learning (ML) model; and (c) communicating the computed score for the dress combination for the user to the clothing matching system. In another embodiment, the computer implemented method further includes the following steps to provide a score for a training image using an image training system: (a) demarcating a face region, a torso region, and a bottom region of one or more training images; (b) detecting a colour and a pattern type of clothes that a person worn in the training image; (c) detecting whether clothes that worn by the person in the training image suit a body type of the person; (d) detecting a skin tone of the person in the training image; (e) providing a score for dress combination for the training image; and (f) providing an annotation for dress combination on the training image. In another embodiment, the computer implemented method further includes the following steps: (a) detecting a gender, and an age of the user from the captured image (b) communicating the information related to the gender, and the age of the user to the server; and (c) receiving annotations for the captured image of the user from the server. In yet another embodiment, the computer implemented method further includes the following steps: (a) receiving the information related to the gender, and the age of the user from the clothing matching system; (b) computing said score for (i) a face region, a torso region, and a bottom region of the captured image, and (ii) the entire captured image of the user; (c) providing annotation on whether the dress combination of the user in the captured image is good or bad, dashing, gorgeous, dull, passable, or not quite; and (d) communicating the annotation of the captured image to the clothing matching system.

In another aspect, a non-transitory program storage device readable by computer, and includes a program of instructions executable by the computer to perform a method for detecting characteristics information related to a captured image of a user to compute a score for dress combination using a clothing matching system. The method includes: (a) receiving the characteristics information associated with the captured image such as at least one of (i) a colour coordination and contrast of clothes, (ii) a dress colour and pattern type of the clothes, (iii) a body type of the user, (iv) whether the clothes that worn by said user in the captured image suit said body type of the user and/or fit the user, (v) a skin tone of the user, and (vi) an information related to a gender, and age of the user from the clothing matching system; (b) computing the score for dress combination for the captured image of the user by comparing (i) the colour coordination and contrast of the clothes, (ii) the dress colour and pattern type of the clothes, (iii) the body type of the user, (iv) whether the clothes that worn by the user in the captured image suit the body type of the user and/or fit the user, and (v) the skin tone of the user in the captured image with thousands of trained images/patterns that is stored in a machine-learning (ML) model; (c) computing the score for (i) a face region, a torso region, and a bottom region of the captured image, and (ii) the entire captured image of the user; (d) providing annotation on whether the dress combination of the user in the captured image is good or bad, dashing, gorgeous, dull, passable, or not quite; and (d) communicating (i) the computed score for the dress combination for the user, and (ii) annotation for the captured image of the user to the clothing matching system.

In one embodiment, the clothing matching system performs the following steps: (a) capturing an image of the user when the user wears clothes that want to buy; (b) recognizing the image of the user when the image is captured using a first computing device; (c) identifying, and demarcating a face region, a torso region, and a bottom region of the captured image; (d) detecting a colour and pattern type of clothes that the user wearing in the captured image; (e) detecting whether the clothes that worn by the user in the captured image suit body type of the user; (f) detecting a skin tone of the user in the captured image; (f) detecting a gender, and age of the user from the captured image; (g) communicating characteristics information related to the captured image that comprises at least one of (i) the colour coordination and contrast of the clothes, (ii) the dress colour and pattern type of the clothes, (iii) the body type of the user, (iv) whether the clothes that worn by the user in the captured image suit a body type of the user and/or fit the user, (v) the skin tone of the user, and (vi) the information related to the gender, and the age of the user to a server; and (h) receiving (i) the computed score for the captured image of the user, and (ii) annotations for the captured image of the user from the server to display the computed score and annotations to the user through the first computing device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2A illustrates an exploded view of a clothing matching system of FIG. 1 according to an embodiment herein;

FIG. 4 is an exemplary tabular view that illustrates a score for each region of the captured image of FIG. 1 according to an embodiment herein;

DETAILED DESCRIPTION OF PREFERRED EMBODIMENTS

Figure 1:
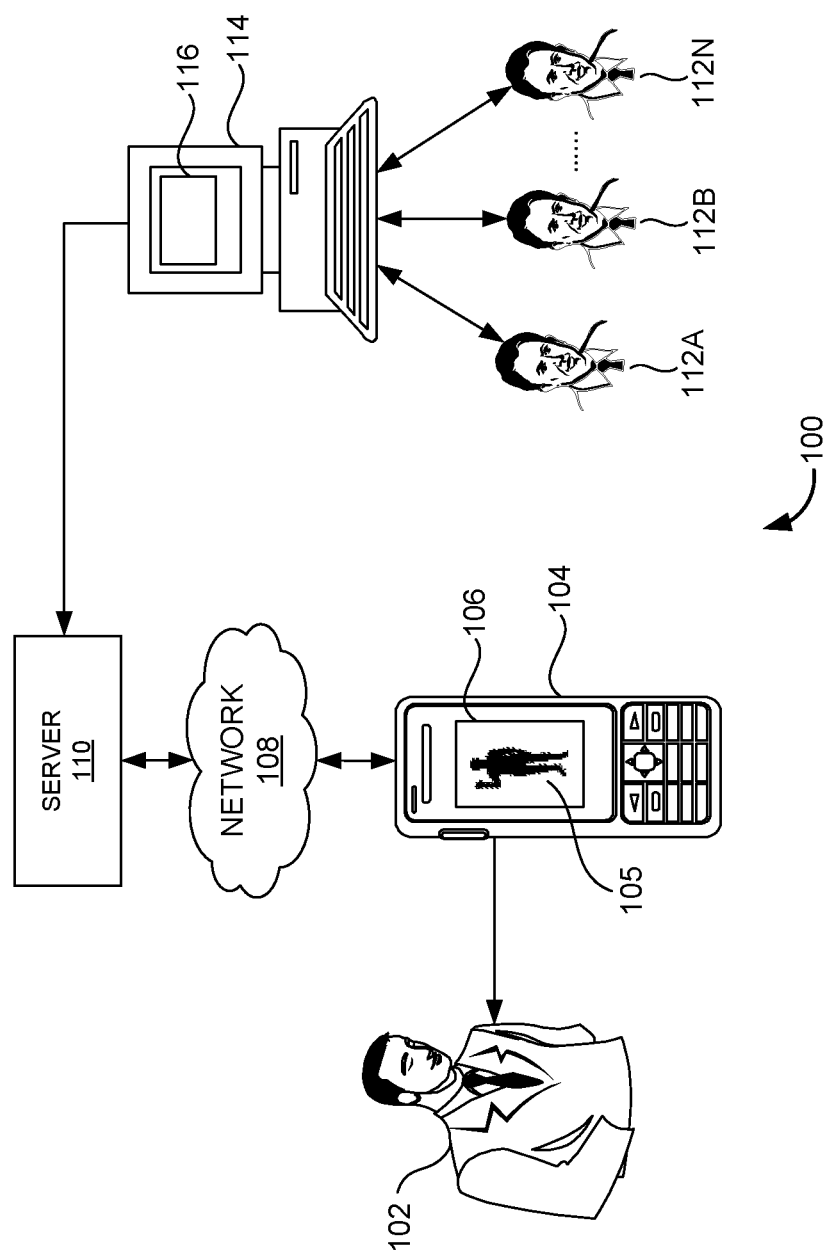
FIG. 1 illustrates a system view of a user communicating with a first computing device to obtain a score for a captured image of the user using a clothing matching system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved system to compute a score for a captured image of a user based on the dress combination. The embodiments herein achieve this by providing a clothing matching system that computes a score for a captured image of a user. Referring now to the drawings, and more particularly to FIGS. 1 through 9, where similar reference characters denote corresponding features consistently throughout the figures, preferred embodiments are shown.

FIG. 1 illustrates a system view 100 of a user 102 communicating with a first computing device 104 to obtain a score for a captured image 105 of the user 102 using a clothing matching system 106 according to an embodiment herein. The user 102 interacts with the first computing device 104 to capture an image (e.g., a selfie) of the user 102 when the user 102 wears the clothes that he/she wants to buy or try on. In one embodiment, the first computing device 104 is a laptop, a mobile phone, a tablet, and/or a personal computer. The first computing device 104 may include a camera to capture the image of the user 102. The clothing matching system 106 automatically recognizes the captured image 105 of the user 102 once the image is captured. The clothing matching system 106 analyzes the captured image 105 of the user 102 to compute a score for the dress worn (i.e. indicating a numerical interpretation of the degree of matching of the dress worn by the user 102). The system view 100 further includes a network 108, a server 110, one or more human labellers 112A-N, a second computing device 114, and an image training system 116. In one embodiment, the clothing matching system 106 communicates with the server 110 through the network 108 to (a) analyze the captured image 105 of the user 102, and (b) compute a score for the captured image 105 of the user 102. The image training system 116 is configured to provide one or more options to the one or more human labellers 112A-N (e.g., experience fashion technologist) to annotate (e.g., label) thousands of training images/patterns as but not limited to good or bad dressed people, dashing, gorgeous, dull, passable, or not quite. In one embodiment, the image training system 116 provides one or more options to the one or more human labellers 112A-N to demarcate a face region, a torso region, and a bottom region of each of the training images. In one embodiment, the bottom region is subdivided into a leg region, and a feet region. The image training system 116 provides one or more options to the one or more human labellers 112A-N to provide (a) a score for a face region, a torso region, and a bottom region of each of the training images based on the characteristics (e.g., a colour coordination, a dress colour, a pattern of clothes, a body type, etc.) of demarcated regions, (b) a score for each of the training images (i.e. entire image) based on the characteristics (e.g., a colour coordination, a dress colour, a pattern of clothes, a body type, etc.) of the training image, and (c) annotations (e.g., labels) for each of the training images (i.e. whether the dress combination of a person in each of the training images is but not limited to good or bad, dashing, gorgeous, dull, passable, or not quite).

In an embodiment, the server 110 includes a machine-learning (ML) model that stores annotated training images and/or patterns, and a set of rules to compute a score for the captured image 105 of the user 102. In one embodiment, when the user 102 captures an image with the clothes worn that he/she wants to buy, the clothing matching system 106 automatically recognizes the captured image 105 of the user 102 using image processing techniques. The clothing matching system 106 identifies a face region, a torso region, and a bottom region of the user 102 from the captured image 105. The clothing matching system 106 demarcates a face region, a torso region, and a bottom region of the captured image 105 (e.g., a selfie) and communicates the demarcated regions (i.e. the face region, the torso region, and the bottom region of the captured image 105) to the server 110. In an embodiment, the bottom region of the captured image 105 is subdivided into a leg region (to identify pants, skirts etc.), and a feet region (to identify shoes). The clothing matching system 106 further identifies characteristics of the captured image 105 such as a (i) a colour coordination and contrast of the captured image 105, (ii) a dress colour and a pattern of clothes of the user 102 in the captured image 105, (iii) a body type of the user 102, and/or (iv) a skin tone of the user 102 in the captured image 105, and communicates the characteristics information to the server 110 to compute a score associated with the captured image 105. The server 110 compares the characteristics information related to the captured image 105 of the user 102 with the annotated training images/patterns stored in the machine learning (ML) model to (a) compute a score for the captured image 105 of the user 102, and/or (b) provide feedback/annotation (e.g., label) whether the dress combination worn by the user 102 in the captured image 105 is but not limited to good or bad, dashing, gorgeous, dull, passable, or not quite. The server 110 compares the information related to the captured image 105 of the user 102 with the annotated training images/patterns stored in the machine learning (ML) model to compute a score for the captured image 105 of the user 102 for rating the dress combination. The machine learning (ML) model may be a convolution neural net based model, a LR model, decision trees, forests, etc. In one embodiment, the machine learning (ML) model library may be defined by python language, R language, Java language, and/or C++ language. In one embodiment, the machine learning model can be made using a tool such as Azure ML on an algorithm as a service model, and the body part demarcation can be executed using a tool such as project Oxford, that allows facial detection based on a pictures as a service model.

In one embodiment, the server 110 computes (i) a cumulative score for the entire captured image 105 of the user 102, and (ii) individual scores for the face region, the torso region, and the bottom region of the captured image 105. The server 110 communicates the scores to the clothing matching system 106 to display the scores to the user 102. In an embodiment, the clothing matching system 106 includes an image-processing component to identify a gender, an age, a body type, and/or a skin tone of the user 102 from the captured image 105 and communicates the information related to the gender, age, body type, and skin tone of the user 102 to the server 110 to compute a score for rating the dress combination for the captured image 105 of the user 102. In one embodiment, the clothing matching system 106 provides binary feedback (i.e. annotation) on whether the dress combination in the captured image 105 is good or bad, dashing, gorgeous, dull, passable, or not quite.

In an embodiment, the server 110 communicates a set of rules related to match the various characteristics such as skin tone and dress colour, fitting information, colour contrast, etc, to the clothing matching system 106 to compute a score for the captured image 105 of the user 102. In one embodiment, the clothing matching system 106 includes the machine-learning (ML) model to compute a score for the captured image 105 of the user 102.

FIG. 2A illustrates an exploded view of a clothing matching system 106 of FIG. 1 according to an embodiment herein. The clothing matching system 106 includes a database 202, an image recognition module 204, an image information communication module 206, and a score receiving module 208. The image recognition module 204 is configured to capture an image of the user when the user 102 wears clothes that he/she wants to buy or evaluate. The image recognition module 204 is further configured to automatically process the captured image 105 (i.e. selfie) of the user 102 to detect (i) a colour and a pattern type of the clothes that the user 102 worn in the captured image 105, (ii) whether the clothes that worn by the user 102 in the captured image 105 suit a body type of the user 102 and/or fit the user, and (iii) a skin tone of the user 102 in the captured image 105. In one embodiment, the image recognition module 204 includes a colour coordination module, a fit analysis module, and a skin tone detection module (e.g., not shown). The colour coordination module is configured to detect a colour and a pattern type of the clothes that the user 102 worn in the captured image 105. In one embodiment, the fit analysis module is configured to detect whether the clothes that worn by the user 102 in the captured image 105 suit a body type of the user 102 and/or fit the user. In another embodiment, the skin tone detection module is configured to detect a skin tone of the user 102 in the captured image 105. In yet another embodiment, the image recognition module 204 identifies a gender, and an age of the user 102 from the captured image 105.

The image information communication module 206 is configured to communicate information related to the captured image 105 of the user 102 such as (i) the colour coordination and contrast of the captured image 105, (ii) the dress colour and pattern type of the clothes, (iii) the body type of the user 102, and (iv) the skin tone of the user 102 to the server 110. In one embodiment, the image information communication module 206 communicates a gender, and an age of the user 102 to the server 110. The score receiving module 208 is configured to (i) receive a computed score for the captured image 105 of the user 102 from the server 110, and (ii) display the received score to the user 102 through the first computing device 104. In one embodiment, the score receiving module 208 receives feedback/annotation (e.g., if the dress combination is good, bad, dashing, gorgeous, dull, passable, or not quite) for the captured image 105 of the user 102 from the server 110. The database 202 stores annotations and the computed score for the captured image 105 of the user 102. In one embodiment, the database 202 stores a set of rules to compute a score for the captured image 105 of the user 102 for the dress combination. In one embodiment, the image recognition module 204 includes a body part demarcation module that is configured to identify and demarcate a face region, a torso region, a bottom region and/or a leg/foot region of the user 102 in the captured image 105.

Figure 2B:
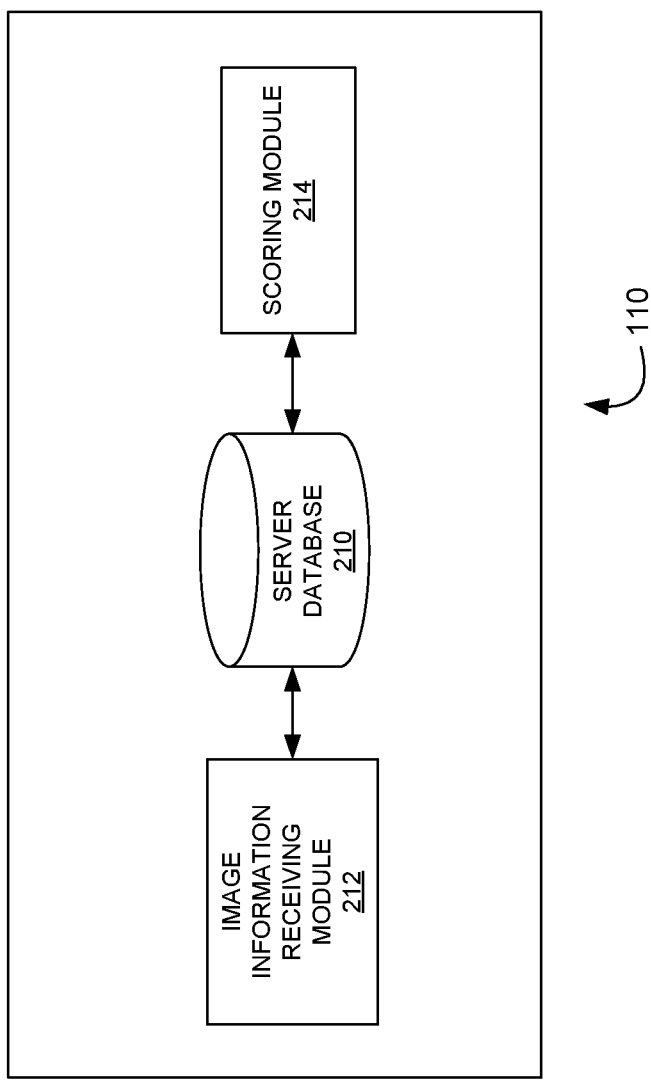
FIG. 2B illustrates an exploded view of a server of FIG. 1 according to an embodiment herein.

FIG. 2B illustrates an exploded view of the server 110 of FIG. 1 according to an embodiment herein. The server 110 includes a server database 210, an image information receiving module 212, and a score detection module 214. The server database 210 includes a machine-learning (ML) model to store the trained images/patterns, a score provided by the one or more human labellers 112A-N for each of the training images, annotations associated with each of the training images, a set of rules to compute a score for the captured image 105 of the user 102, and a computed score for the dress combination for the captured image 105 of the user 102. The image information receiving module 212 is configured to receive characteristics information related to the captured image 105 of the user 102 such as (i) the colour coordination and contrast of the captured image, (ii) the dress colour and the pattern type of the clothes, (iii) the body type of the user 102, and (iv) the skin tone of the user 102, etc. from the clothing matching system 106 to compute a score for the dress combination for the captured image 105 of the user 102.

In one embodiment, the image information receiving module 212 receives information related to a gender type, and an age of the user 102 from the clothing matching system 106. The scoring module 214 is configured to (i) compute a score for dress combination for the captured image 105 of the user 102 by comparing characteristics information of the captured image 105 such as (a) the colour coordination and contrast of the captured image 105, (b) the dress colour and the pattern type of the clothes, (c) the body type of the user 102, and (d) the skin tone of the user 102 with the annotated training images and/or patterns that are stored in the machine learning (ML) model, and (ii) communicate the computed score for the dress combination to the clothing matching system 106. In one embodiment, the scoring module 214 computes individual scores for a face region, a torso region, and a bottom region of the captured image 105. In one embodiment, the scoring module 214 is configured to (i) provide feedback/annotation on whether the dress combination of the user 102 in the captured image 105 is good or bad, dashing, gorgeous, dull, passable, or not quite, and (ii) communicate the feedback/annotation to the clothing matching system 106.

Figure 3:
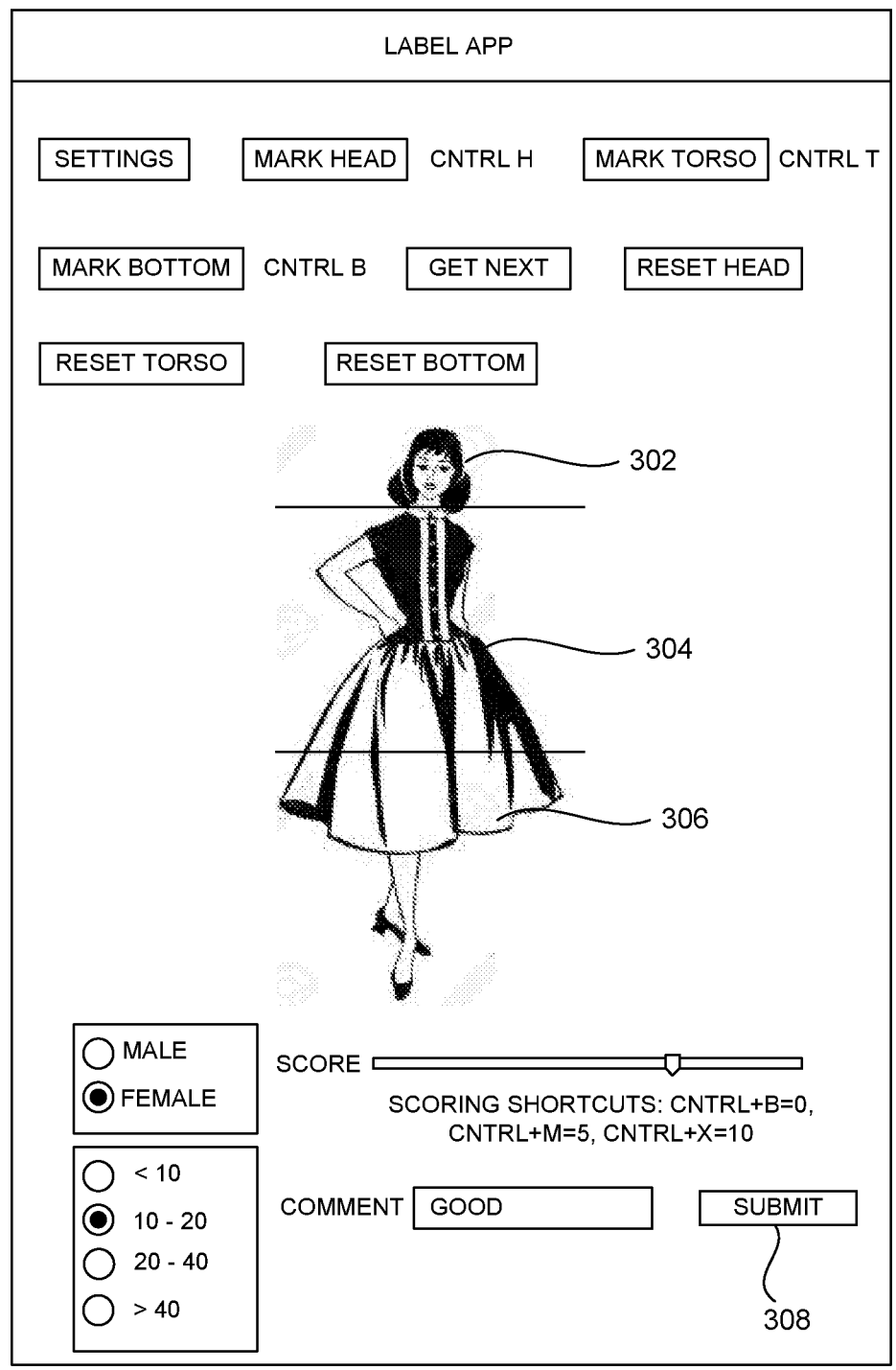
FIG. 3 illustrates a user interface view of an image training system of FIG. 1 according to an embodiment herein.

FIG. 3 illustrates a user interface view 300 of the image training system 116 of FIG. 1 according to an embodiment herein. The user interface view 300 of the image training system 116 provides one or more options to the one or more human labellers 112A-N to train thousands of training images. The user interface view 300 of the image training system 116 provides one or more options to the one or more human labellers 112A-N to (i) demarcate a face region 302, a torso region 304, and a bottom region 306 of each of the training images, and (ii) provide a score for the entire training image for dress combination. In an embodiment, a bottom region 306 is subdivided into a leg region (to identify pants, skirts etc.), and a feet region (to identify shoes). In one embodiment, the user interface view 300 of the image training system 116 provides an option to the one or more human labellers 112A-N to provide a score for a face region 302, a torso region 304, and a bottom region 306 of the training image. The user interface view 300 of the image training system 116 further provides one or more options to the one or more human labellers 112A-N to provide annotations (e.g., labels) to the training images (e.g., whether the dress combination of a person in the training image is good or bad, dashing, gorgeous, dull, passable, or not quite). The user interface view 300 of the image training system 116 provides an option to the one or more human labellers 112A-N to provide a score for the training image based on (i) colour coordination and contrast of the training image, (ii) dress colour and pattern type of the clothes in the training image, (iii) whether the clothes suit a body type of a person in the training image, and/or (iv) a skin tone of a person in the training image. In one embodiment, when (a) a score, and/or (b) a comment/annotation (e.g., labels) for the training images are provided, the user interface view 300 of the image training system 116 provides an option to the one or more human labellers 112A-N to select a submit option 308 to store the training images with score and annotation in the server database 210.

FIG. 4 is an exemplary tabular view that illustrates a score for each region of the captured image 105 of FIG. 1 according to an embodiment herein. The server 110 may compute a score for the captured image 105 of the user 102 based on the training images that are stored in the server database 210 of the server 110. For example, the server 110 may compute (a) a score for (i) the face region 302, (ii) the torso region 304, and/or (iii) the bottom region 306 of the captured image 105 of the user 102, and (b) a cumulative score 402 for the entire captured image 105 of the user 102 by comparing (i) a colour coordination and contrast of the captured image 105, (ii) dress colour and the pattern type of clothes in the captured image 105, (iii) a body type of the user 102 in the captured image 105, and/or (iv) a skin tone of the user 102 in the captured image 105 with the annotated training images stored in the server database 210. In one embodiment, the server 110 computes the cumulative score 402 for the captured image 105 without demarcating the face region 302, the torso region 304, and the bottom region 306 from the captured image 105.

Figure 5A:
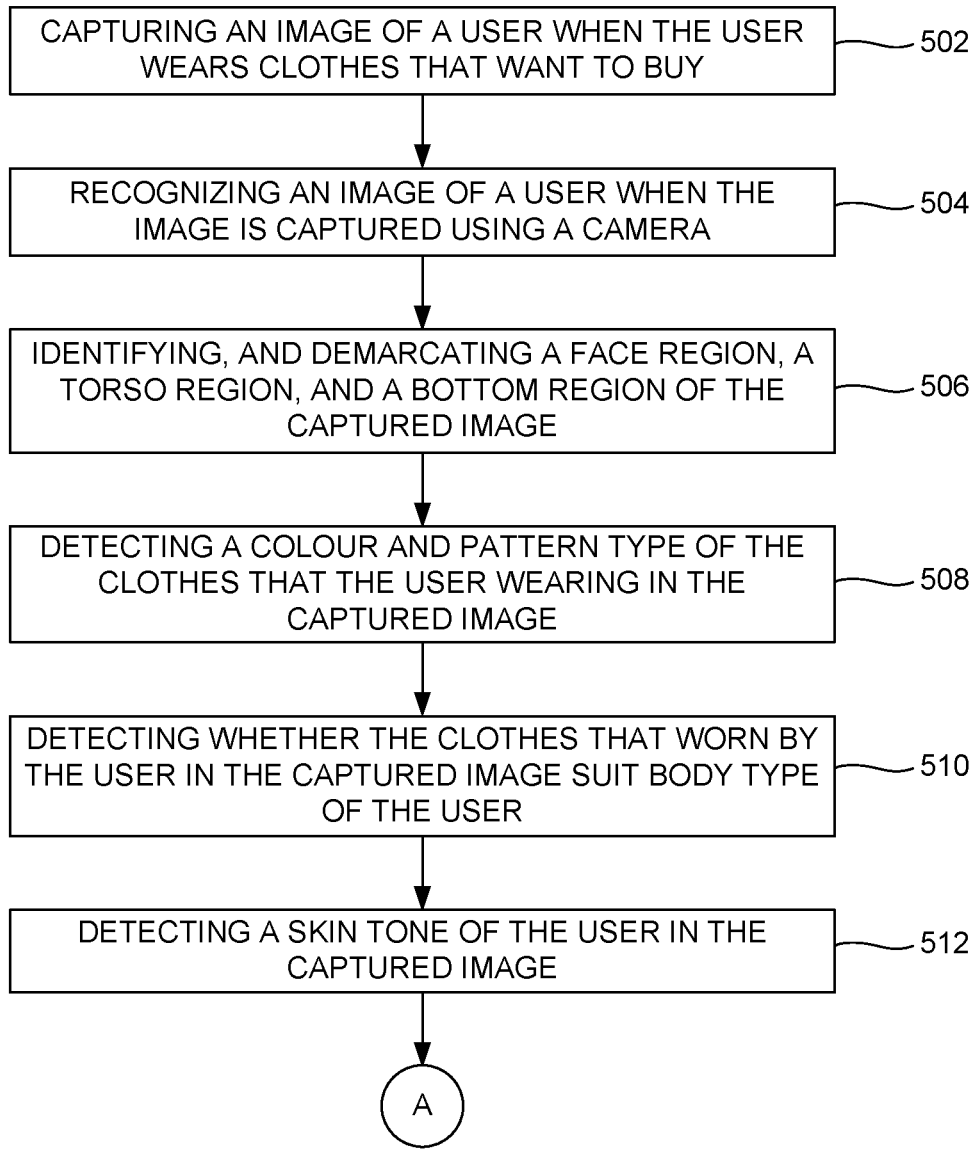
FIGS. 5A and 5B are flow diagrams illustrating a method of providing a score for the captured image of the user for the dress combination using the clothing matching system of FIG. 1 according to an embodiment herein.
Figure 5B:
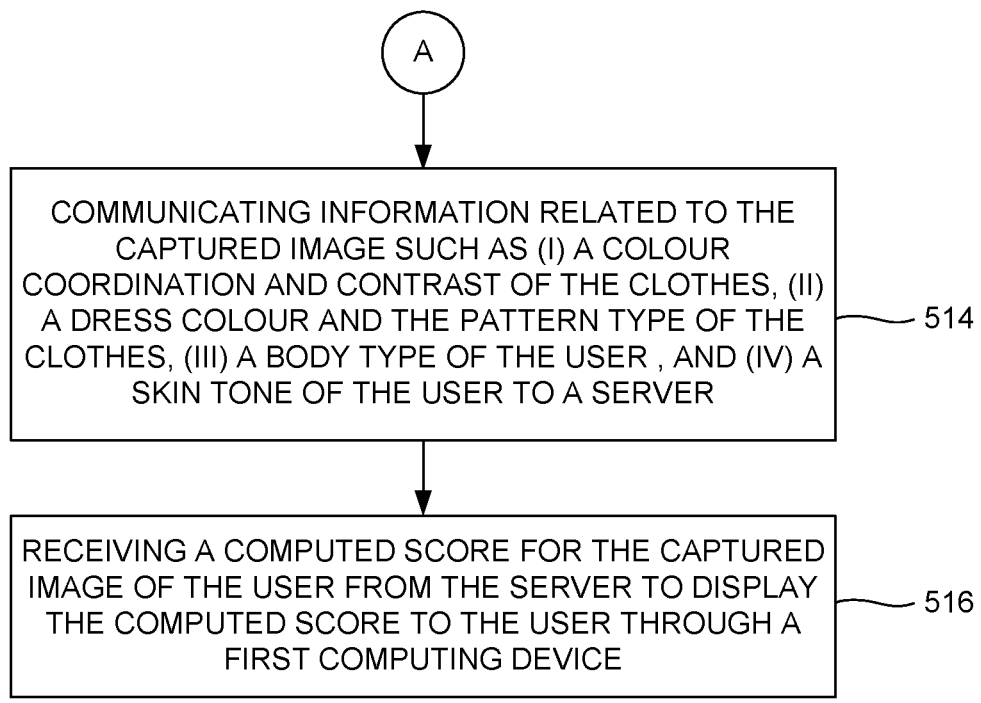

FIGS. 5A and 5B are flow diagrams illustrating a method of providing a score for the captured image 105 of the user 102 for the dress combination using the clothing matching system 106 of FIG. 1 according to an embodiment herein. At step 502, the user 102 interacts with the first computing device 104 to capture an image (e.g., a selfie) of the user 102 when the user 102 wears the clothes that he/she wants to buy or evaluate. At step 504, the clothing matching system 106 automatically processes the captured image 105 using image processing techniques when the image of the user 102 is captured. At step 506, the clothing matching system 106 demarcates a face region, a torso region, and a bottom region of the captured image 105 (i.e. a selfie). At step 508, the clothing matching system 106 detects a colour and a pattern type of the clothes worn by the user 102 in the captured image 105. At step 510, the clothing matching system 106 detects whether the clothes worn by the user 102 in the captured image 105 suits a body type of the user 102. At step 512, the clothing matching system 106 detects a skin tone of the user 102 in the captured image 105. In one embodiment, the clothing matching system 106 detects a gender, and age of the user 102 from the captured image 105. At step 514, the clothing matching system 106 communicates information related to the captured image 105 such as (i) the colour coordination and contrast of the captured image 105, (ii) the dress colour and the pattern type of the clothes that the user 102 wearing in the captured image 105, (iii) the body type of the user 102, and (iv) the skin tone of the user 102 to the server 110. In one embodiment, the clothing matching system 106 communicates the information related to the gender, and age of the user 102 to the server 110. At step 518, the clothing matching system 106 is configured to (i) receive the computed score for the captured image 105 of the user 102 from the server 110, and (ii) display the computed score to the user 102 through the first computing device 104. In one embodiment, the clothing matching system 106 receives annotations (e.g., whether the dress combination of the user 102 in the captured image 105 is good or bad, dashing, gorgeous, dull, passable, or not quite) from the server 110.

Figure 6:
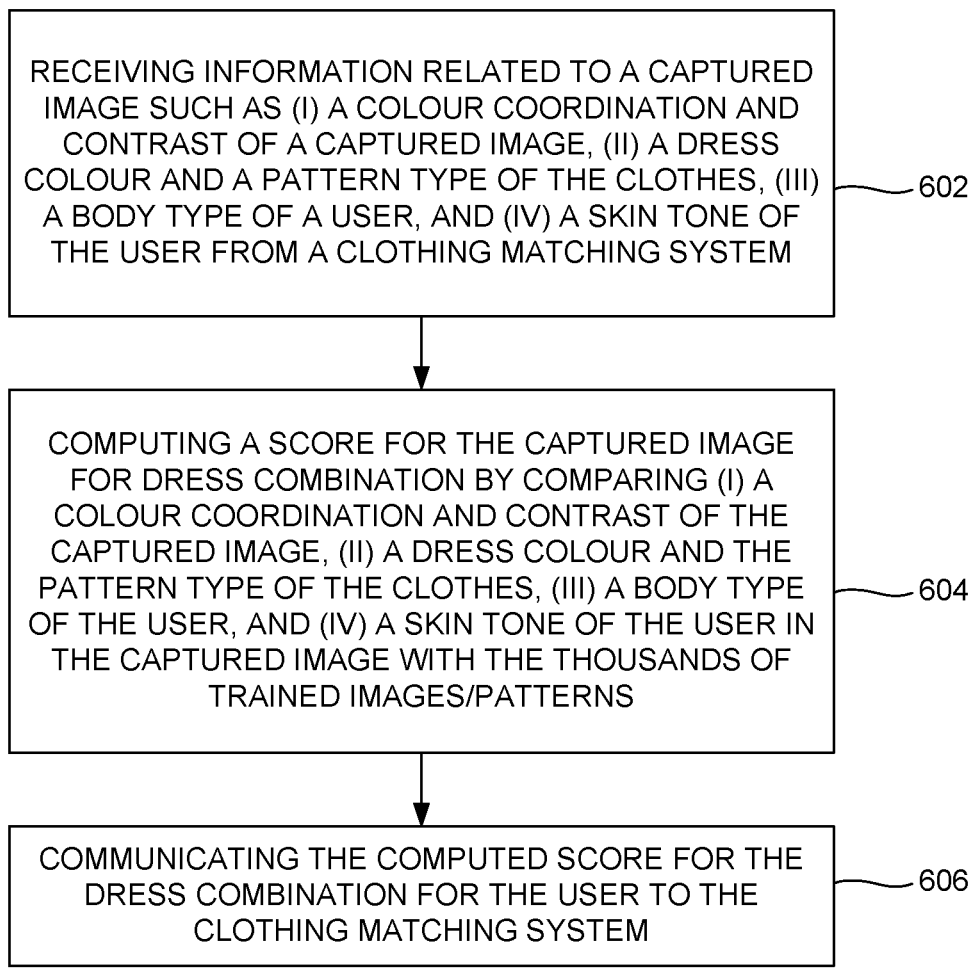
FIG. 6 is a flow diagram illustrating a method of computing a score for the dress combination for the captured image of the user using the server of FIG. 1 according to an embodiment herein.

FIG. 6 is a flow diagram illustrating a method of computing a score for the dress combination for the captured image 105 of the user 102 using the server 110 of FIG. 1 according to an embodiment herein. At step 602, the server 110 receives information related to the captured image 105 such as (i) the colour coordination and contrast of the captured image 105, (ii) the dress colour and the pattern type of the clothes of the user 102, (iii) the body type of the user 102, and (iv) the skin tone of the user 102 from the clothing matching system 106 to compute a score for the dress combination in the captured image 105 of the user 102. In one embodiment, the server 110 receives the information related to the gender, and age of the user 102 from the clothing matching system 106. At step 604, the server 110 is configured to compute a score for the dress combination in the captured image 105 by comparing information related to the captured image 105 (e.g. (i) colour coordination and contrast of the captured image 105, (ii) a dress colour and a pattern of clothes of the user 102 in the captured image 105, (iii) a body type of the user 102, and (iv) a skin tone of the user 102 in the captured image 105) with the annotated training images/patterns stored in the machine learning (ML) model.

At step 606, the server 110 is configured to communicate the computed score for the dress combination in the captured image 105 of the user 102 to the clothing matching system 106. In one embodiment, the server 110 computes a score for a face region, a torso region, and a bottom region of the captured image 105. In an embodiment, the server 110 (i) provides an annotation (e.g., label) on whether the dress combination of the user 102 in the captured image 105 is good or bad, dashing, gorgeous, dull, passable, or not quite, and (ii) communicates the annotation of the captured image 105 to the clothing matching system 106.

Figure 7:
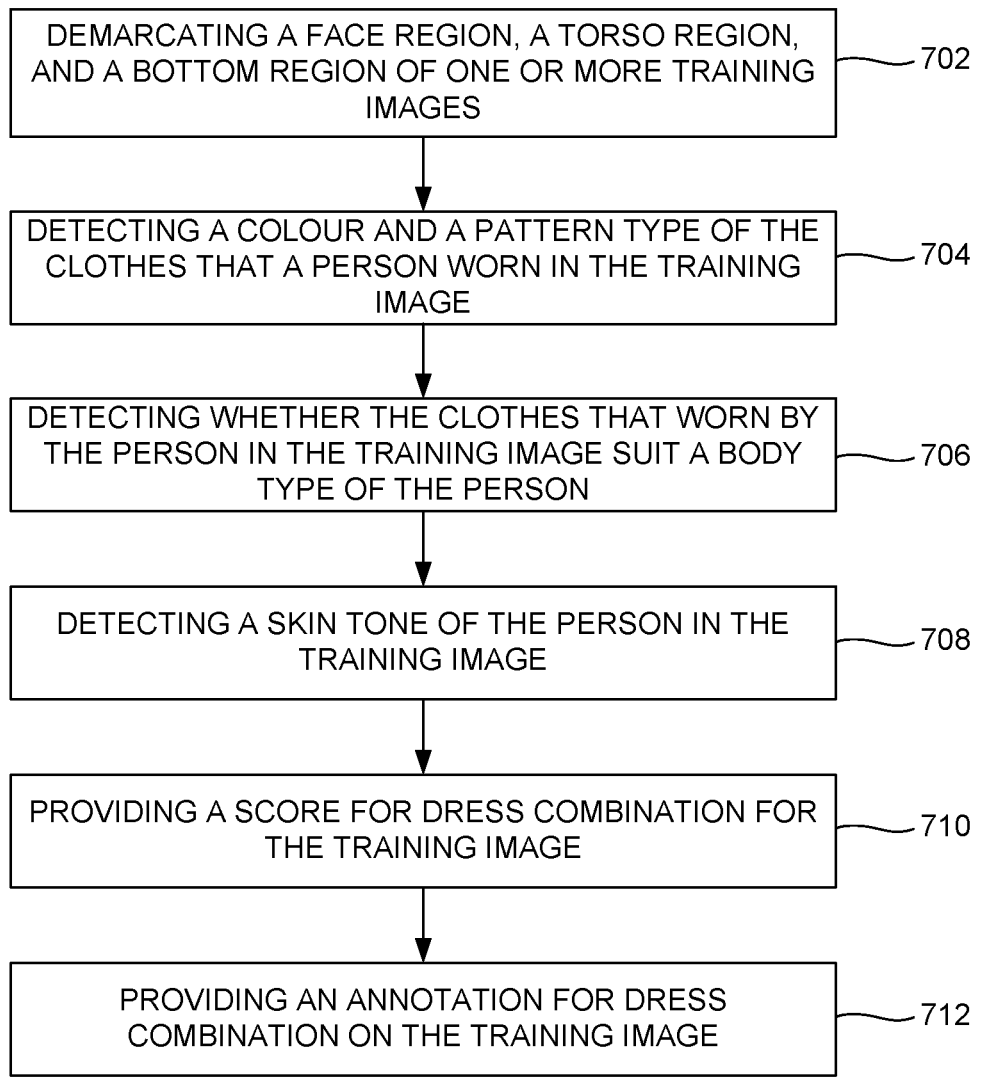
FIG. 7 is a flow diagram illustrating a method of providing a score for a training image using the image training system of FIG. 3 according to an embodiment herein.

FIG. 7 is a flow diagram illustrating a method of providing a score for a training image using the image training system 116 of FIG. 3 according to an embodiment herein. At step 702, the image training system 116 provides an option to the one or more human labellers 112A-N to identify and demarcate a face region, a torso region, and a bottom region of each of one or more training images. At step 704, the image training system 116 provides an option to the one or more human labellers 112A-N to identify a color and a pattern type of the clothes that a person is wearing in a training image. At step 706, the image training system 116 provides an option to the one or more human labellers 112A-N to detect whether the clothes that worn by a person in the training image suit the body type of the person. At step 708, the image training system 116 provides an option to the one or more human labellers 112A-N to detect a skin tone of the person in the training image. At step 710, the image training system 116 provides an option to the one or more human labellers 112A-N to provide a score for the entire training image. In an embodiment, the image training system 116 provides an option to the one or more human labellers 112A-N to provide a score for a face region, a torso region, and a bottom region of the training image. At step 712, the image training system 116 provides an option to the one or more human labellers 112A-N to provide annotations (e.g., labels) for the training images on whether the dress combination in the training image is good or bad, dashing, gorgeous, dull, passable, or not quite. The image training system 116 provides an option to the one or more human labellers 112A-N to provide (a) a score for a face region, a torso region, and a bottom region of the training image, (b) a score for the entire image, and (c) annotations (i.e. labels) for the training image based on information related to (i) a colour coordination and contrast of the training image, (ii) a dress colour and a pattern type of the clothes in the training image, (iii) whether the clothes suit a body type of a person in the training image, and/or (iv) a skin tone of a person in the training image.

Figure 8:
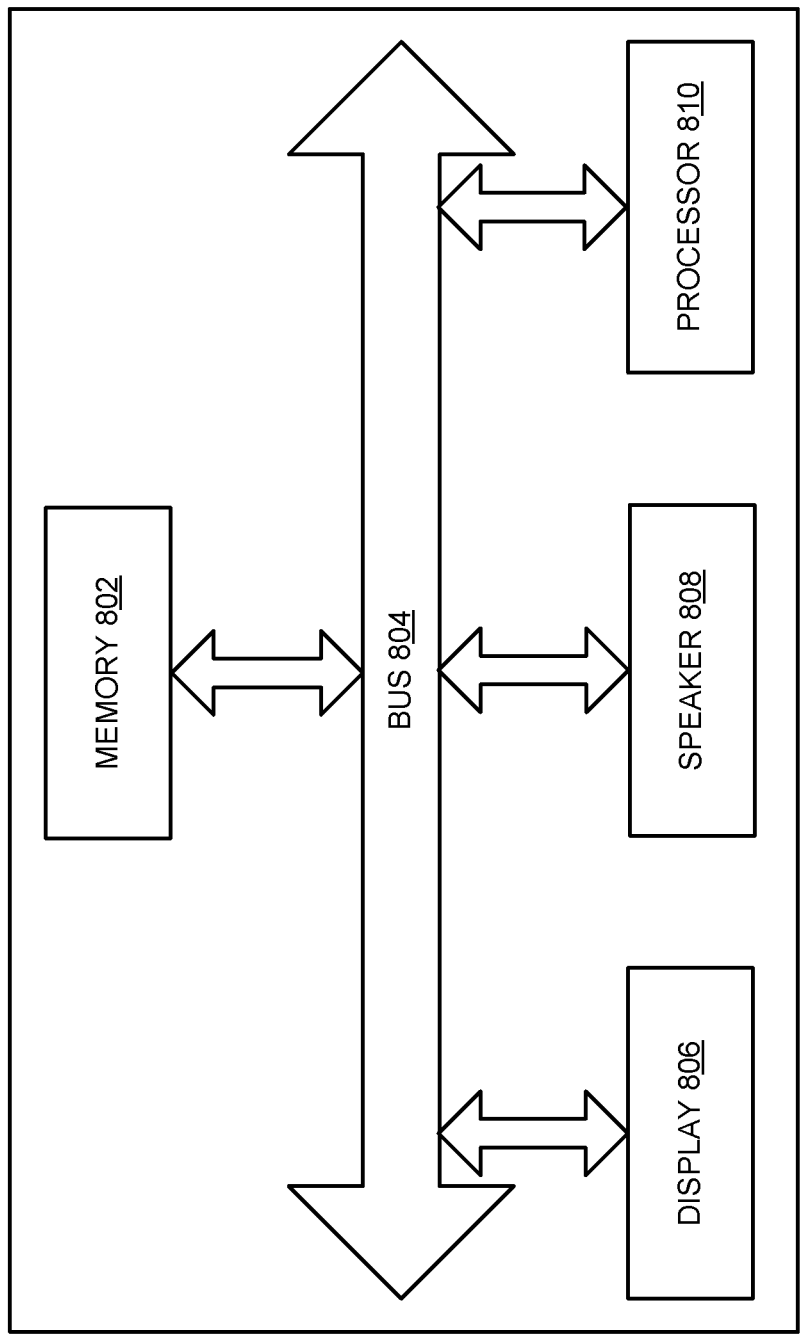
FIG. 8 illustrates an exploded view of a personal communication device according to the embodiments herein.

FIG. 8 illustrates an exploded view of the personal communication device having an a memory 802 having a set of computer instructions, a bus 804, a display 806, a speaker 808, and a processor 810 capable of processing a set of instructions to perform any one or more of the methodologies herein, according to an embodiment herein. The processor 810 may also enable digital content to be consumed in the form of video for output via one or more displays 806 or audio for output via speaker and/or earphones 808. The processor 810 may also carry out the methods described herein and in accordance with the embodiments herein.

Digital content may also be stored in the memory 802 for future processing or consumption. The memory 802 may also store program specific information and/or service information (PSI/SI), including information about digital content (e.g., the detected information bits) available in the future or stored from the past. A user of the personal communication device may view this stored information on display 806 and select an item of for viewing, listening, or other uses via input, which may take the form of keypad, scroll, or other input device(s) or combinations thereof. When digital content is selected, the processor 810 may pass information. The content and PSI/SI may be passed among functions within the personal communication device using the bus 804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface inter connections or buried inter connections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
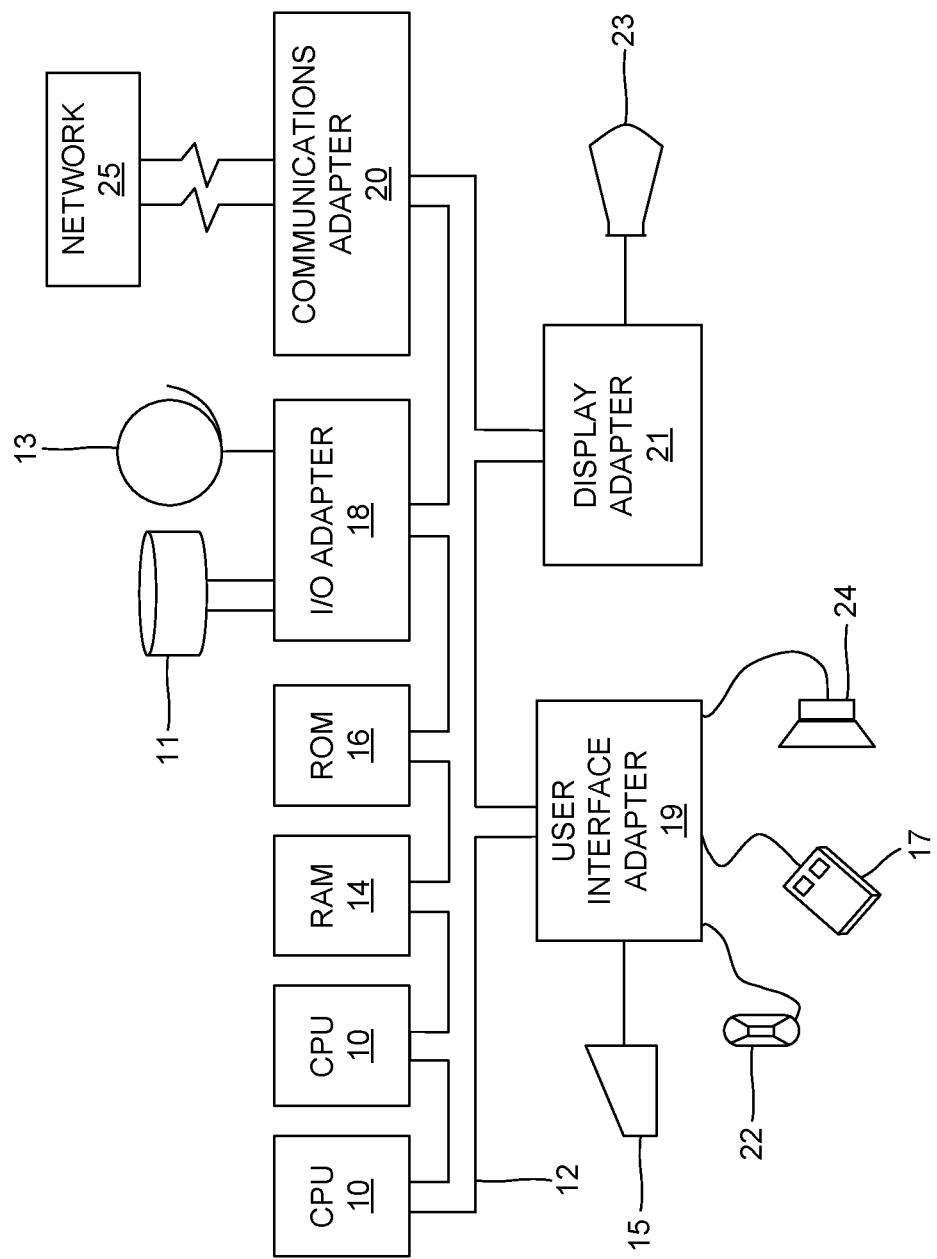
FIG. 9 a schematic diagram of computer architecture used in accordance with the embodiment herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The clothing matching system 106 automatically computes a score for the dress combination of the user 102 in the captured image 105 in real time without human intervention. The score does not require the user to subjectively evaluate his/her own appearance, but is based on a machine learning model that is trained by inputs from experts based on ratings, feedback, and/or annotations of a large number of images (e.g., thousands of images). The clothing matching system 106 enables the user 102 to make quick decisions on what to wear or what to buy without having to depend only on his/her own judgement or the judgement of friends.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A clothing matching system for computing a score associated with a dress combination for a user, wherein said clothing matching system comprises:

a memory that stores a database and a first set of modules, wherein said database comprises at least one of (i) annotations and a computed score for a captured image of said user, and (ii) a set of rules to compute said score for said captured image;

a processor that executes said first set of modules, wherein said first set of modules comprises:
an image recognition module, executed by said processor, analyses an image of said user when said user wearing clothes for evaluation, wherein said image recognition module automatically recognizes said captured image of said user once said image is captured through a first computing device, wherein said image recognition module comprises:
a colour coordination module, executed by said processor, detects a colour and a pattern type of said clothes that worn by said user in said captured image;
a fit analysis module, executed by said processor, detects whether said clothes worn by said user in said captured image suit a body type of said user and/or fit said user; and
a skin tone detection module, executed by said processor, detects a skin tone of said user in said captured image;
an image information communication module, executed by said processor, communicates characteristics information related to said captured image of said user to a server to compute a score associated with said dress combination for said captured image of said user, wherein said server comprises a machine-learning (ML) model that stores (i) trained images/patterns, (ii) a score provided by a plurality of human labellers for each of training images, (iii) annotations associated with each of said training images, (iv) a set of rules to compute a score for a captured image of a user, wherein said server (i) computes said score associated with said dress combination for said captured image of said user by comparing said characteristics information of said captured image with said annotated training images and/or patterns that are stored in said machine learning (ML) model, and (ii) communicates said computed score associated with said dress combination for said user to said clothing matching system; and
a score receiving module, executed by said processor, that (i) receives said computed score for said captured image of said user from said server, and (ii) displays said received score to said user through said first computing device.

2. The clothing matching system of claim 1, wherein said image recognition modules further comprises a body part demarcation module, executed by said processor, identifies and demarcates a face region, a torso region, a bottom region and/or a leg/foot region of said user in said captured image.

3. The clothing matching system of claim 1, wherein said server comprises:
a server memory that stores a server database and a second set of modules, wherein said server database comprises said machine-learning (ML) model that stores at least one of (i) trained images/patterns, (ii) a score provided by a plurality of human labellers for each of training images, (iii) annotations associated with each of said training images, (iv) a set of rules to compute a score for a captured image of a user, and (v) a computed score for dress combination for said captured image of said user;
a server processor that executes said second set of modules, wherein said second set of modules comprises:
an image information receiving module, executed by said server processor, that receives said characteristics information related to said captured image of said user from said clothing matching system to compute said score associated with said dress combination for said captured image of said user; and
a scoring module, executed by said server processor, that (i) computes said score for dress combination for said captured image of said user by comparing said characteristics information of said captured image with said annotated training images and/or patterns that are stored in said machine learning (ML) model, and (ii) communicates said computed score for said dress combination to said clothing matching system.

4. The clothing matching system of claim 1, wherein said image recognition module automatically processes said captured image of said user to detect said characteristics information that comprises at least one of (i) a colour coordination and contrast of said captured image, (ii) a dress colour and a pattern type of clothes, (iii) a body type of said user, (iv) whether said clothes worn by said user in said captured image suit a body type of said user and/or fit said user, and (v) a skin tone of said user.

5. The clothing matching system of claim 1, wherein said image recognition module identifies a gender and an age of said user from said captured image through an image-processing component.

6. The clothing matching system of claim 5, wherein said image information communication module communicates said gender and said age information of said user to said server to compute a score associated with said dress combination for said captured image of said user.

7. The clothing matching system of claim 1, wherein said score receiving module receives (i) said score for said captured image of said user, and (ii) a feedback/annotation for said captured image of said user from said server.

8. The clothing matching system of claim 1, wherein said clothing matching system automatically recognizes said captured image of said user using image processing techniques when said user captures an image through said first computing device.

9. The clothing matching system of claim 1, wherein said clothing matching system comprises an image-processing component to identify said characteristics information associated with said captured image of said user.

10. The clothing matching system of claim 1, wherein said system further comprises an image training system that provides a plurality of options to a plurality of human labellers to (a) demarcate (i) a face region, (ii) a torso region, and (iii) a bottom region of each of said training images, (b) provide a score for (i) said face region, (ii) said torso region, and (iii) said bottom region of each of said training images based on characteristics of demarcated regions that comprising at least one of a colour coordination, a dress colour, a pattern of clothes, a body type, (iii) provide a score for each of said training images based on said characteristics of said training images.

11. The clothing matching system of claim 10, wherein said image training system provides an option to said plurality of human labellers to annotate training images/patterns as at least one of, but not limited to (i) good or bad dressed people, (ii) dashing, (iii) gorgeous, (iv) dull, (v) passable, or (vi) not quite based on said characteristics of said captured image.

12. The clothing matching system of claim 3, wherein said image information receiving module receives information related to a gender type and an age of said user from said clothing matching system.

13. The clothing matching system of claim 3, wherein said scoring module (i) computes (a) a cumulative score for said entire captured image of said user, and (b) an individual scores for said face region, said torso region, and said bottom region of said captured image of said user, (ii) provide feedback/annotation on whether said dress combination of said user in said captured image as at least one of, but not limited to (a) good or bad, (b) dashing, (c) gorgeous, (d) dull, (e) passable, or (f) not quite, and (iii) communicate (i) said feedback/annotation, and (ii) said score for said captured image to said clothing matching system.

14. A computer implemented method for detecting characteristics information related to a captured image of a user to compute a score for dress combination using clothing matching system, said method comprising:
capturing an image of said user when said user wearing clothes for evaluation;
recognizing said image of said user when said image is captured using a first computing device;
identifying and demarcating a face region, a torso region, and a bottom region of said captured image;
detecting a colour and pattern type of clothes that said user wearing in said captured image;
detecting whether said clothes worn by said user in said captured image suit body type of said user;
detecting a skin tone of said user in said captured image;
communicating said characteristics information related to said captured image that comprises at least one of (i) a colour coordination and contrast of said clothes, (ii) a dress colour and pattern type of said clothes, (iii) a body type of said user, (iv) whether said clothes worn by said user in said captured image suit a body type of said user and/or fit said user, and (v) a skin tone of said user to a server, wherein said server comprises a machine-learning (ML) model that stores (i) trained images/patterns, (ii) a score provided by a plurality of human labellers for each of training images, (iii) annotations associated with each of said training images, (iv) a set of rules to compute a score for a captured image of a user, wherein said server (i) computes said score associated with said dress combination for said captured image of said user by comparing said characteristics information of said captured image with said annotated training images and/or patterns that are stored in said machine learning (ML) model, and (ii) communicates said computed score associated with said dress combination for said user to said clothing matching system; and
receiving a computed score for said captured image of said user from said server to display said computed score to said user through said first computing device.

15. The computer implemented method of claim 14, wherein said server performing steps of:
receiving said characteristics information associated with said captured image that comprising at least one of (i) said colour coordination and contrast of said clothes, (ii) said dress colour and pattern type of said clothes, (iii) said body type of said user, (iv) whether clothes worn by said user in said captured image suit said body type of said user and/or fit said user, and (v) said skin tone of said user from said clothing matching system;
computing said score for dress combination for said captured image of said user by comparing (i) said colour coordination and contrast of said clothes, (ii) said dress colour and pattern type of said clothes, (iii) said body type of said user, (iv) whether said clothes worn by said user in said captured image suit said body type of said user and/or fit said user, and (v) said skin tone of said user in said captured image with trained images/patterns that are stored in a machine-learning (ML) model; and
communicating said computed score associated with said dress combination for said user to said clothing matching system.

16. The computer implemented method of claim 15, further comprising steps to provide a score for said training image using an image training system that performing steps of:
demarcating a face region, a torso region, and a bottom region of a plurality of training images;
detecting a colour and a pattern type of clothes that a person worn in said training image;
detecting whether clothes worn by said person in said training image suit a body type of said person;
detecting a skin tone of said person in said training image;
providing a score for dress combination for said training image; and
providing an annotation for dress combination on said training image.

17. The computer implemented method of claim 14, further comprising steps of:
detecting a gender, and an age of said user from said captured image; and
communicating said information related to said gender, and said age of said user to said server; and
receiving annotations for said captured image of said user from said server.

18. The computer implemented method of claim 15, further comprising steps of:
receiving said information related to a gender, and an age of said user from said clothing matching system;
computing said score for (i) a face region, a torso region, and a bottom region of said captured image, or (ii) said entire captured image of said user;
providing annotation for said captured image whether said dress combination of said user in said captured image is good or bad, dashing, gorgeous, dull, passable, or not quite; and
communicating said annotation for said captured image to said clothing matching system.

19. One or more non-transitory computer readable storage mediums storing one or more sequences of instructions, which when executed by one or more processors, causes computing a score associated with dress combination for a user by processing characteristics information related to a captured image, by performing the steps of:
receiving said characteristics information associated with said captured image that comprising at least one of (i) a colour coordination and contrast of clothes, (ii) a dress colour and pattern type of said clothes, (iii) a body type of said user, (iv) whether said clothes worn by said user in said captured image suit said body type of said user and/or fit said user, (v) a skin tone of said user, and (vi) an information related to a gender, and age of said user from a clothing matching system;
receiving a demarcated face region, a torso region, and a bottom region of said captured image from said clothing matching system;
computing said score for dress combination for said captured image of said user by comparing (i) said colour coordination and contrast of said clothes, (ii) said dress colour and pattern type of said clothes, (iii) said body type of said user, (iv) whether said clothes that worn by said user in said captured image suit said body type of said user and/or fit said user, and (v) said skin tone of said user in said captured image with trained images/patterns that are stored in a machine-learning (ML) model; and computing said score for (i) a face region, a torso region, and a bottom region of said captured image, or (ii) said entire captured image of said user;

providing annotation for said dress combination of said user in said captured image; and communicating (i) said computed score for said dress combination for said user, and (ii) annotation for said captured image of said user to said clothing matching system.

20. The one or more non-transitory computer readable storage mediums storing one or more sequences of instructions of claim 19, wherein said clothing matching system performing steps of:

capturing an image of said user when said user wearing clothes for evaluation;

recognizing said image of said user when said image is captured using a first computing device;

identifying and demarcating a face region, a torso region, and a bottom region of said captured image;

detecting a colour and pattern type of clothes that said user wearing in said captured image;

detecting whether said clothes worn by said user in said captured image suit body type of said user;

detecting a skin tone of said user in said captured image;

detecting a gender, and an age of said user from said captured image;

communicating said characteristics information related to said captured image that comprising at least one of (i) said colour coordination and contrast of said clothes, (ii) said dress colour and pattern type of said clothes, (iii) said body type of said user, (iv) whether said clothes worn by said user in said captured image suit a body type of said user and/or fit said user, (v) said skin tone of said user, and (vi) said information related to said gender, and said age of said user to a server; and receiving (i) said computed score for said captured image of said user, and (ii) annotations for said captured image of said user from said server to display said computed score and annotations to said user through said first computing device.

* * * * *